Sept. 17, 1929.  W. BRAUER  1,728,591
PUMP PISTON
Filed Aug. 21, 1928
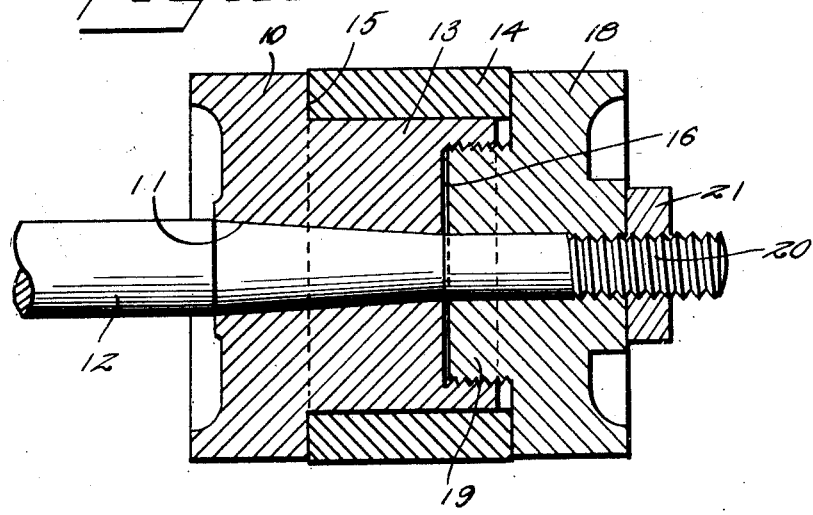
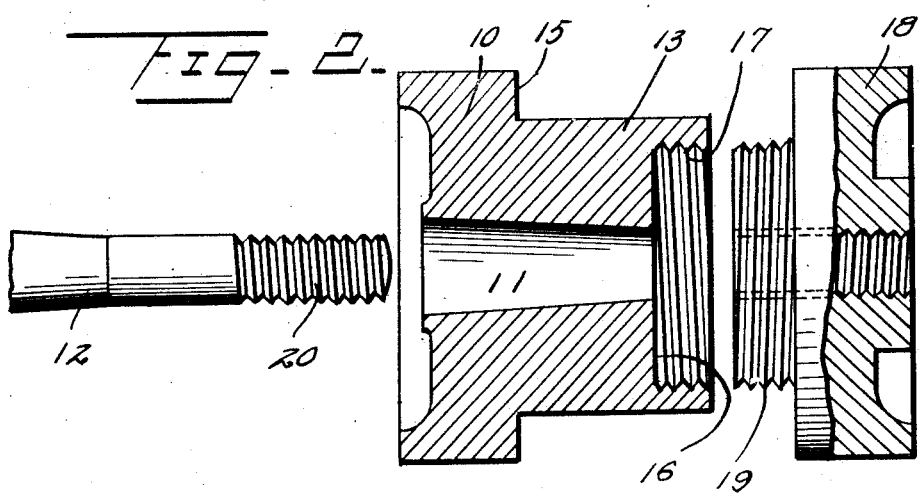
Inventor
Walter Brauer
By Watson E. Coleman
Attorney Patented Sept. 17, 1929

1,728,591

UNITED STATES PATENT OFFICE

WALTER BRAUER, OF SEMINOLE, OKLAHOMA

PUMP PISTON

Application filed August 21, 1928. Serial No. 301,075.

This invention relates to pump pistons and has for a particular object thereof the provision of a pump piston construction which will prevent hammering, resulting in the ordinary piston construction when the packing becomes worn and loosened and the follower plate is accordingly freed for movement between the packing and the retaining nut. Such pounding often results in extensive damage if not breakage of the piston or of the rod with the usual attendant result of the breaking of a head of an engine cylinder. This renders the ordinary pump piston particularly inefficient and dangerous when employed with slush pumps of well drilling apparatus which are employed to circulate matter containing a considerable quantity of grit and in which accordingly a fairly rapid wear upon the packing results.

A further and more specific object of the invention is to provide a construction positively locking the piston, follower plate and the rod in a unit after an adjustment has been made which will prevent any relative movement thereof.

These and other objects I attain by the construction shown in the accompanying drawing, wherein for the purpose of illustration is shown a preferred embodiment of my invention and wherein:—

Figure 1 is a longitudinal sectional view through a pump piston constructed in accordance with my invention showing the parts assembled;

Figure 2 is a similar view showing the parts disassembled.

Referring now more particularly to the drawing, the numeral 10 generally designates the piston body of a pump piston, having a tapered bore 11 to receive the piston rod 12. Such pistons are exteriorly reduced at their outer ends, as indicated at 13, thereby producing a packing space for the reception of a packing 14 and a shoulder 15 against which one end of this packing may seat. In accordance with my invention, the outer end face of the piston body is recessed, as at 16, and the side walls of the recess are threaded, as at 17. The follower plate 18, which is employed, may be of the usual construction, with the exception of the fact that it is provided upon its inner face with an exteriorly threaded boss 19 for coaction with the threads 17 of the recess. The rod 12 is provided with threads 20 reversely formed as regards the threads 17 and a nut 21 is mounted upon these threads.

In the use of the device, it will be obvious that adjustment of the packing may be had by rotating the follower in its threaded engagement with the threads 17 until the packing is properly situated. The jam nut is then applied and seated firmly against the follower plate. It will be obvious that any tendency to rotation on the part of either jam nut or the follower plate will result in a tightening of the engagement therebetween and an increase of the jamming engagement.

Since the threaded engagement between the piston and the follower prevents relative movement thereof and the piston is seated upon the taper of the pump rod and is held against this taper by the jam nut engaging the follower, it will be obvious that even though the packing be entirely destroyed, there can be no relative movement of the several parts.

Since the construction hereinbefore set forth is capable of a certain range of change and modification without materially departing from the spirit of the invention, I do not limit myself to such specific structure except as hereinafter claimed.

I claim:—

A pump piston including the usual rod, piston body and follower, the piston body being exteriorly produced to form a packing space and a shoulder against which one end of the packing may engage, the outer end face of the piston body having a recess formed therein the wall of which is threaded, a threaded boss upon the follower plate for engagement in said boss, the piston and follower having rod bores for the reception of said rod and a jam nut mounted upon the rod and engaging the follower plate, said jam nut and the rod being oppositely threaded as respects the threads of said boss.

In testimony whereof I hereunto affix my signature.

WALTER BRAUER.